US008923487B2

(12) United States Patent
Alloin et al.

(10) Patent No.: US 8,923,487 B2
(45) Date of Patent: Dec. 30, 2014

(54) DIAGNOSTICS PRIMITIVES ON L2/ERB NORMALIZED ERROR SAMPLES

(71) Applicant: Ikanos Communications, Inc., Fremont, CA (US)

(72) Inventors: Laurent F. Alloin, Monmouth Beach, NJ (US); Ming Gu, Holmdel, NJ (US); Laurent Pierrugues, Fort Lee, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 39 days.

(21) Appl. No.: 13/625,191

(22) Filed: Sep. 24, 2012

(65) Prior Publication Data

US 2013/0170628 A1 Jul. 4, 2013

Related U.S. Application Data

(60) Provisional application No. 61/538,461, filed on Sep. 23, 2011.

(51) Int. Cl.
*H04M 3/34* (2006.01)
*H04L 12/26* (2006.01)
*H04L 1/00* (2006.01)
*H04L 1/20* (2006.01)

(52) U.S. Cl.
CPC ............. *H04M 3/34* (2013.01); *H04L 43/0811* (2013.01); *H04L 43/0823* (2013.01); *H04L 1/0026* (2013.01); *H04L 1/20* (2013.01)
USPC ............. 379/22; 379/257; 379/350; 375/257; 375/222; 375/227

(58) Field of Classification Search
USPC .......................................... 379/350; 375/257
See application file for complete search history.

(56) References Cited

U.S. PATENT DOCUMENTS

| 2007/0286397 | A1* | 12/2007 | Hublet et al. | 379/350 |
|---|---|---|---|---|
| 2010/0091889 | A1* | 4/2010 | Wu et al. | 375/257 |
| 2010/0199152 | A1 | 8/2010 | Ver Steeg | |
| 2011/0110409 | A1 | 5/2011 | Sands et al. | |
| 2011/0142111 | A1 | 6/2011 | Sands et al. | |

OTHER PUBLICATIONS

Miguel Peeters—DSL CrosstalkCancellation—Globecom 2009—18 pages.*
International Search Report and Written Opinion issued Feb. 28, 2013 for PCT/US2012/05694.
Baldi, M., Chiaraluce, F., Garello, R., Polano, M., Valentini M., "Analytical evaluation of the role of estimation and quantization errors in downstream vectored VDSL systems," International Journal on Advances in Telecommunications, Sep. 15, 2011, vol. 4, No. 1 & 2, pp. 24-33.
Itu-T G. 993.5, "Self-FEXT cancellation (vectoring) for use with VDSL2 transceivers," Series G: Transmission Systems and Media, Digital Systems and Networks, International Telecommunication Union Apr. 2010.

* cited by examiner

*Primary Examiner* — Joseph J Nguyen
(74) *Attorney, Agent, or Firm* — Pillsbury Winthrop Shaw Pittman LLP

(57) ABSTRACT

Derivations of new PHY layer diagnostics primitives are based on the normalized error samples collected through G.993.5. The processing uses the ERB and L2 Ethernet packet encapsulation of these ERB data in order to abstract the processing from the PHY layer device dependency, as well as to allow a local and remote processing of the primitives for diagnostics purposes.

22 Claims, 15 Drawing Sheets

DIAGNOSTICS PRIMITIVES ON L2/ERB NORMALIZED ERROR SAMPLES

CROSS-REFERENCE TO RELATED APPLICATIONS

The present application claims priority to U.S. Prov. Appln. No. 61/538,461, filed Sep. 23, 2011, the contents of which are incorporated herein by reference in their entirety.

FIELD OF THE INVENTION

The present application relates generally to data networks, and more particularly to methods and apparatuses for deriving new primitives from L2 ERB error data and otherwise using, decoding and sharing information from L2 ERB error data.

BACKGROUND OF THE INVENTION

New monitoring diagnostics are desirable in a G.993.5 (G.vector) environment, given the increase of rates after self-induced far-end cross talk (self-FEXT) cancellation and the increased susceptibility of the downstream receiver to changing noise and crosstalk conditions, given the higher downstream rates achievable. For example, currently only average per bin estimates of the SNR is available per the G.997.1 (G.ploam) standard for report to diagnostics and monitoring SW modules, limiting the ability of those diagnostic tools to detect and interpret the nature and changes in noise environment.

Furthermore, the SNR per bin primitives derived is the result of an average process which is only valid with the assumption of certain noise characteristics, such as Gaussian and stationary characteristics. Finally, the SNR average process is proprietary and is basically equivalent to a filtering process, which in essence will filter out certain non-ideal characteristics of the noise source.

Accordingly, a need exists for deriving new primitives that allow finer analysis of the nature and changes of the noise sources. These primitives should ideally be derived on a standardized input, enabling diagnostics that are independent of any proprietary implementation as is required today, and that can also be carried out locally on the CPE transceiver or elsewhere remotely.

SUMMARY OF THE INVENTION

The present invention provides methods and apparatuses for deriving, using, decoding and sharing information from standardized error data. According to certain aspects, embodiments of the invention utilize Level-2 downstream (L2 DS) error packets (ERB/normalized error samples) collected in accordance with G.993.5 for monitoring of the downstream path in a VDSL system. The monitoring can be performed on the customer premises equipment (CPE) itself or on a remote diagnostics application. The standardized format of the packets ensures that the offline or real time processing of the data in this monitoring application can be executed either on local or remote processors.

According to certain other aspects, embodiments of the invention utilize the L2 DS error packets obtained through the same process for other line monitoring purposes for a SMART CPE or remote debugging application. The standardized format of the packets ensures that the off-line or real time processing of the data proposed in this monitoring application can be executed either on local or remote processors.

According to further aspects, embodiments of the invention provide an intelligent diagnostics S/W suite running on a VDSL PHY CPE device that provide two new capabilities: 1) ability to derive new physical layer primitives based on the standardized sync symbol error, allowing the development of new diagnostic features that do not exist today in the standardized VDSL-PHY primitives (known as per carrier data); and 2) the ability to develop a portable application, across platforms and processors (including competitors' products), which does not require a new physical (PHY) layer development, provided these platforms adhere to the generation of the L2 DS error packet format, as per the G.993.5 standard. One implementation of the new primitives is based on the standardized normalized error sample, and ERB data format generated by the CPE PHY device for received synchronization symbols, in order to be as independent as possible from the PHY layer device, and allow processing on remote entities. Processing of the raw normalized error samples allows derivation of new quantities, for example: 1) XPSD and FEXT coupling; 2) SNR and Line Referred Noise based on Synch Symbol; 3) Fext-Free and background Noise measurement estimate; 4) Histogram and moments of noise distribution on individual carrier basis; and 5) Cross-correlation between adjacent tones; and 6) Own transmitter non-linearity measurement.

According to yet further aspects, embodiments of the invention provide a set of diagnostics features based on the processing of the standardized synchronization symbol error, wherever access to downstream error packet exists. That includes, but is not limited to the Vector Control Entity (smart VCE), or any remote monitoring applications to which those L2 DS error packets are forwarded for the purpose of downstream PHY layer diagnosis.

In accordance with these and other aspects, a method implemented in a communications system according to embodiments of the invention includes utilizing data in standard error packets to monitor line conditions in a downstream path in the communications system, the monitored line conditions being used by at least one of customer premises equipment (CPE) and remote diagnostics applications.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
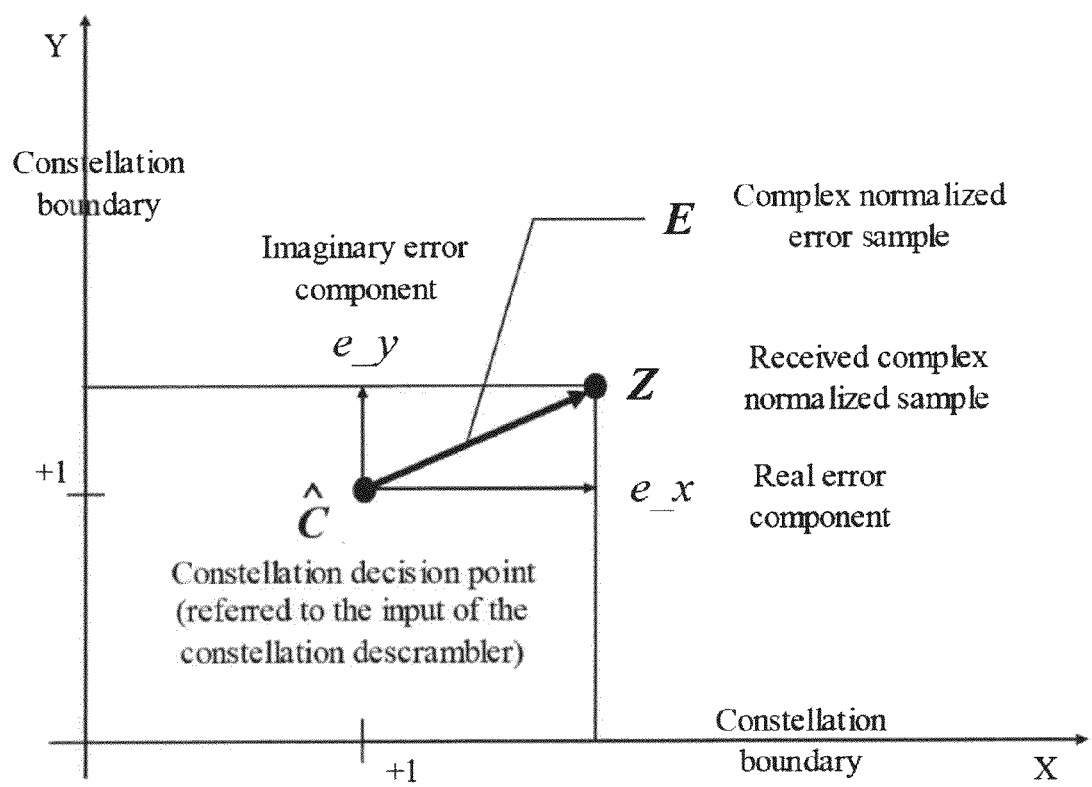
FIG. 1 is a diagram illustrating the computation of a normalized error sample E for a particular sub-carrier in a particular sync symbol according to ITU-T G.993.5.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain general aspects, embodiments of the invention use the Level 2 downstream (L2 DS) error packets for line monitoring and other purposes on customer premises equipment (CPE) or a remote debugging application. The standardized format of the packets ensures that the off-line or real time processing of the data proposed in this monitoring application can be executed either on local or remote processors.

Level 2 downstream (L2 DS) error packets were introduced within G.993.5 (Self-FEXT cancellation (Vectoring)). The DS errors collected on sync symbols are meant to provide to the VCE (Vectoring Control Entity) the required information to derive the far-end crosstalk (FEXT) coupling impacting the DS receiver and to derive and adapt accordingly the DS precoder to mitigate the impact of self-FEXT users in the DS receiver.

Embodiments of the invention can be implemented in an intelligent diagnostics SW suite running on a very high bit rate digital subscriber line (VDSL) physical layer (PHY) CPE device. Such a suite can provide new and useful capabilities including: 1) deriving new physical layer primitives based on the standardized sync symbol error, allowing for the development of new diagnostic features that do not exist today in the standardized VDSL-PHY primitives (known as per carrier data); and 2) developing a portable application, across platforms and processors (including different suppliers' products), which does not require a new PHY layer development, provided these platforms adhere to the generation of the L2 DS error packet format, as per the G.993.5 standard. According to certain other aspects, diagnostics features based on the processing of the standardized synch symbol error according to embodiments of the invention can be implemented wherever access to downstream error packet exists. That includes, but is not limited to the Vector Control Entity (smart VCE), or any remote monitoring applications to which those L2 DS error packets are forwarded for the purpose of downstream PHY layer diagnosis. Additionally or alternatively, the same diagnostics features can be derived based on the processing of sync symbol error format applied to US errors. Even though the G.993.5 standard only requires encapsulation of L2 DS error packet, the same or other encapsulation format of US error data can be envisaged for portability and transport to a remote entity for the purpose of diagnostics applied on the US channels of VDSL links.

According to certain aspects, the derivation of new diagnostics primitives according to embodiments of the invention are built upon the normalized error samples, the definition and the format of the Error Report Block (ERB), as well as the layer 2 Ethernet encapsulation of the backchannel data defined in G.993.5. Excerpts from the ITU-T standard G.993.5 are presented herein to clarify certain aspects of the invention. However, the invention is not limited to this standard, and those skilled in the art will appreciate how to extend the invention to other standard and proprietary normalized error data after being taught by the present examples.

The VTU-R (VDSL transceiver unit at the remote terminal) converts the received time domain signal into frequency domain samples, resulting in a complex value Z for each of the received sub-carriers. The subsequent constellation de-mapper associates each of these complex values Z with a constellation point, represented by a value $\hat{C}$. FIG. 1 shows the computation of a normalized error sample E for a particular sub-carrier in a particular sync symbol. The normalized error sample represents the error between the received complex data sample Z normalized to the 4-QAM constellation point and the corresponding decision constellation point $\hat{C}$ associated with the received sync symbol in a VTU-R and referred to the input of the constellation descrambler. For illustration, in FIG. 1, the received normalized complex data sample Z is shown to occur within the constellation boundary of the decision constellation point $\hat{C}=(+1, +1)$.

For each of the sub-carriers, the complex normalized error sample E is defined as $E=Z-\hat{C}$, where E is the complex error defined as $E=e\_x+j\times e\_y$ with real component $e\_x$ and imaginary component $e\_y$, and Z is the received normalized data sample defined as $Z=z\_x+j\times z\_y$ with real component $z\_x$ and imaginary component $z\_y$, and $\hat{C}$ is the decision constellation point associated with the received data sample Z, defined as $\hat{C}=\hat{c}\_x+j\times \hat{c}\_y$ with real component $\hat{c}\_x$ and imaginary component $\hat{c}\_y$ (with $\hat{c}\_x=\pm 1$ and $\hat{c}\_y=\pm 1$).

The real and imaginary components of each normalized error sample E are clipped and quantized to integer values for the clipped error sample components q_x and q_y respectively, as follows:

$$q\_x = \max(-2^{B\_{max}}, \min([e\_x \times 2^{N\_{max}}], 2^{B\_{max}}-1))$$

$$q\_y = \max(-2^{B\_{max}}, \min([e\_y \times 2^{N\_{max}}], 2^{B\_{max}}-1))$$

where $Q=q\_x+j\times q\_y$ represents the clipped error sample and N_max represents the VTU-R's maximum quantization depth of normalized error samples and is set to 12, and B_max represents the upper bound of the bit index for reporting clipped error sample components q_x and q_y (B_max<N_max, with B_max configured by the VCE, see Tables 7-1 and 7-2 of ITU-T G.993.5).

The values of both clipped error sample components q_x and q_y are represented using the two's-complement representation of B_max+1 bits. The format of the clipped error sample for reporting over the backchannel is defined in clause 7.2.2 of ITU-T G.993.5. The particular sub-carriers on which clipped error samples are reported during Initialization and Showtime are configured as described in clauses 10.4.2.1, and in clause 8.1, respectively, of ITU-T G.993.5.

The VTU-R sends clipped error samples (defined in clause 7.2.1 of ITU-T G.993.5) to the VTU-O through the backchannel established between the VTU-O and the VTU-R in each line of the vectored group, as defined in clause 7.4.1 (Layer 2 backchannel) of ITU-T G.993.5 or in clause 8.1 (embedded operations channel (eoc) backchannel) of ITU-T G.993.5 or in clause 10 (Special Operation Channel (soc) backchannel) of ITU-T G.993.5. The VTU-O (VDSL transceiver unit at the optical network unit) conveys the received clipped error samples to the VCE of the vectored group.

For each sync symbol, an integer number of octets are sent through the backchannel. The number of bytes per symbol needed to report the clipped error samples depends on the values configured by the VCE for the backchannel control parameters (see clause 7.2.2 of ITU-T G.993.5). Blocks of clipped error samples (error blocks) of the vectored downstream bands are mapped into the Error Report Block (ERB).

Each ERB is associated with a particular symbol of the O-P-VECTOR 2-1 signal (see clause 10.4.3.7 of ITU-T G.993.5). The ERB has a single format that is further encapsulated into an Ethernet format (for an L2-based backchannel), an eoc format (for an eoc-based backchannel), or an SOC format (for an SOC-based backchannel). The sync symbol associated with the ERB is identified by the value of its sync symbol counter (for an L2 or an eoc backchannel during Showtime) or by the timing of the report (for an SOC backchannel during initialization).

Figure 2:
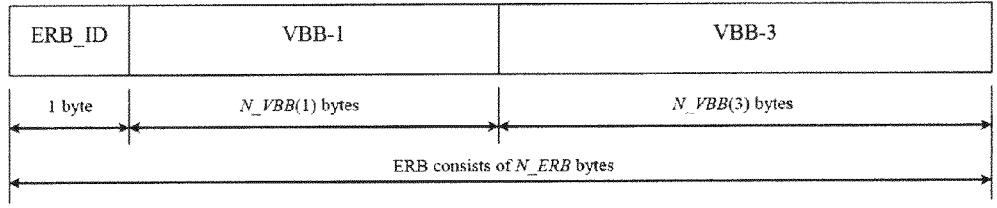
FIG. 2 illustrates the format of the ERB according to ITU-T G.993.5.

The format of the ERB is illustrated in FIG. 2. The ERB starts with an 8-bit ERB_ID field, followed by up to eight vectored band blocks (VBB) fields. The VTU-R may set the MSB of the ERB_ID field to '1' to indicate that the clipped error samples in the ERB are potentially corrupted (e.g., due to impulse noise, or RFI). Otherwise, the VTU-R sets the MSB of the ERB_ID field to '0'. The seven LSB of the ERB_ID field are set to 0 and are reserved for ITU-T. The number of bytes in the ERB (N_ERB) is the sum of the number of bytes in each of the VBBs, plus one byte for the ERB_ID field. The concatenation of VBBs in a ERB shall be in the ascending order of the vectored band numbers, i.e., starting from the vectored band associated with lowest sub-carrier indices. Some vectored bands may not be reported on request of the VCE (i.e., the ERB does not contain a VBB for the vectored bands for which VCE configures L_w=0).

Figure 3:
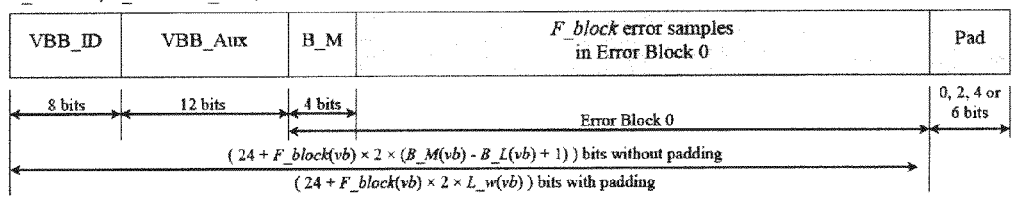
FIG. 3 illustrates the format of the VBB according to ITU-T G.993.5.
Figure 3:
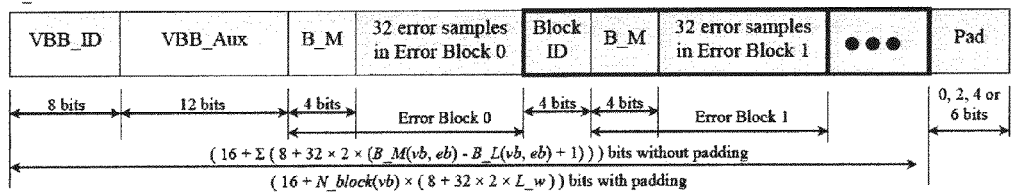
Figure 3:
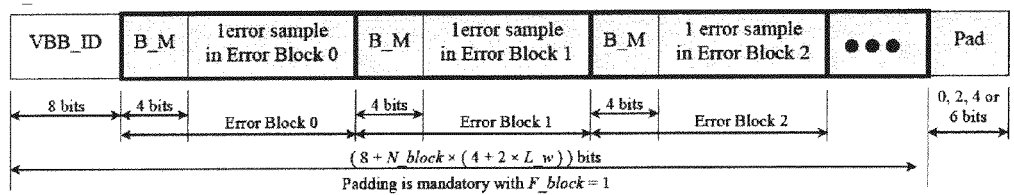

The format of the VBB is illustrated in FIG. 3. As shown, each VBB starts with an 8-bit VBB_ID field, followed by a VBB_Aux field, followed by concatenated error blocks, and ends with a pad of 0, 2, 4 or 6 bits to fit the length of the VBB to an integer number of bytes (odd number of padding bits is not applicable). The three MSB of the VBB_ID field include the number of the vectored band (000 for VBB-0, 001 for VBB-1, . . . up to 111 for VBB-7). The nine LSB of the VBB_ID field are set to '0' and are reserved for ITU-T. The error blocks are concatenated in a VBB in ascending order: the first block inside the vectored band is the one that contains clipped error samples for sub-carriers with lowest indices and are transmitted first.

The format of the error block is defined in clause 7.2.3.2 of ITU-T G.993.5. In case F_block=32, a Block_ID is prepended to each error block, starting with error block number 1. A Block_ID is inserted just before error block 0. The Block_ID is 4 bits long, and represents modulo 16 the number of the error block it precedes as an unsigned integer, based on the assumption that the first block in the vectored band has the number 0.

In case F_block=1 or [N_carrier/F_sub], a Block_ID is not inserted. It should be noted that the VCE can identify VBB in the received ERB by its VBB_ID and then compute the number of error blocks, N_block(vb), in the VBB-vb as described in clause 7.2.2.2 of ITU-T G.993.5, since all the backchannel control parameters are known at the CO-side. The length of the error block is computed using the parameters (B_M, B_L) of the clipped error sample and the block size F_block. The first reported sample of the first error block in the vectored band is for the sub-carrier with index X_L (which is always even).

It should be further noted that with F_block=32, the end of each error block is byte aligned. No padding bits are added at the end of the VBB.

It should be still further noted that the decoding of the ERB format is done with knowledge of parameters that are known by the VCE and which should also therefore be known by any other decoding entity, since the format is somewhat configurable. However this is not always necessary to embodiments of the invention. Rather, the backchannel control parameters are also known to the decoding or in some cases, sent to the decoding entity along with the ERB data.

The VBB_Aux field is used to communicate the mean error value using the format defined in Table 7-3 of ITU-T G.993.5. The mean error (ME) for vectored band vb is computed as:

$$ME(vb) = \sum_{n=0}^{\lceil \frac{N\_carrier(vb)}{F\_sub(vb)} \rceil - 1} (|e\_x(X\_L(vb) + n \times F\_sub(vb))| + |e\_y(X\_L(vb) + n \times F\_sub(vb))|)$$

where e_x(sc) and e_y(sc) are real and imaginary components of the normalized error estimated on subcarrier sc (see FIG. 1).

The clipped and quantized value of ME(vb) is represented as:

$$MEq(vb) = \min([ME(vb) \times 2^{ME\_N\_max-1}], 2^{ME\_B\_max} - 1)$$

where ME_N_max=12 and ME_B_max=22.

The value of the MEq is reported using a 4-bit exponent and an 8-bit mantissa, in the similar way as for the clipped error sample components. The VTU-R computes the scale ME_S as the index of the most significant bit of the MEq that is not a sign extension bit. The mantissa consists of the 8 bits with indices ME_B_M down to ME_B_L. The values of ME_B_M and ME_B_L are computed at the VTU-R as:

$$ME\_B\_M = \max(ME\_S, 7), \text{ and}$$

$$ME\_B\_L = ME\_B\_M - 7$$

TABLE 1

| Format of the VBB_Aux field | | |
|---|---|---|
| Parameter | Bit numbers | Description |
| ME_EXP | [11:8] | 4-bit value of ME_B_L |
| ME_MANT | [7:0] | 8-bit mantissa of the MEq |

Figure 4:
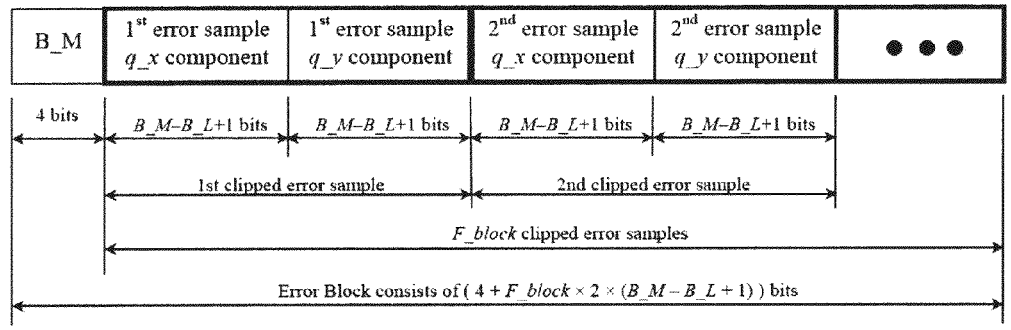
FIG. 4 illustrates the format of the error block according to ITU-T G.993.5.

The representation for an error block containing F_block clipped error samples (2×F_block clipped error sample components of F_block sub-carriers) includes a B_M field (4 bits), and an error field (variable length), as shown in FIG. 4. The error field includes F_block sub-fields, each carrying a complex clipped error sample of a sub-carrier which is assigned for reporting during the backchannel configuration (see clause 7.2.2 of ITU-T G.993.5).

For each clipped error sample component, the compressed representation, as defined in clause 7.2.2.2 of ITU-T G.993.5, includes only those bits of the clipped error sample component with indices B_L through B_M, using the convention that the MSB of the compressed representation of the component has index B_max and the least significant bit (LSB) of the compressed representation of the component has index B_min. Accordingly, the total number of bits in the error field of a block of clipped error samples in compressed representation shall be 2×F_block×(B_M−B_L+1).

The B_M fields include parameter B_M represented as a 4-bit unsigned integer, in the range from 0 to 15. It should be noted that the parameter B_L is not reported as it can be calculated by the VCE from the clipped error sample control parameters (see equations 7-1 and 7-2 of ITU-T G.993.5) and the value of the reported B_M parameter.

The format of the error block is fully shown in FIG. 4. All parameters and clipped error samples are mapped with the MSB at the left side so that the MSB is transmitted first (i.e., the first transmitted bit is the MSB of the B_M field). Clipped error samples in the Error field are mapped in ascending order of sub-carrier index from left to right. For each clipped error sample, the q_x (real) component is mapped left from the q_y (imaginary) component.

If the VCE selects to use this encapsulation type, the backchannel data is encapsulated as defined in clause 7.4.1 of ITU-T G.993.5. Within the network termination (NT), the clipped error samples are first sent from the VTU-R to the L2+ functional block, where they are encapsulated into the layer 2 (Ethernet) protocol for transmittal over Ethernet.

Figure 5:
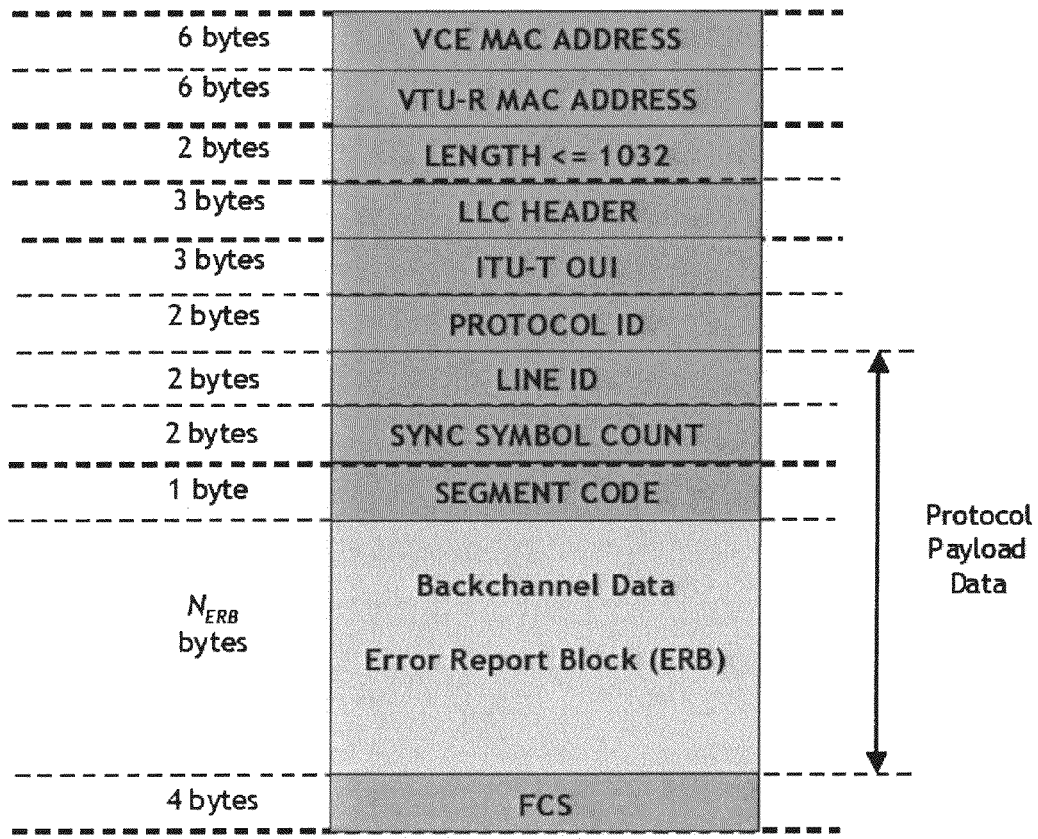
FIG. 5 illustrates Ethernet encapsulation of ERB based on IEEE 802.3 and described in clause 7.4.1 of ITU-T G.993.5.

Ethernet encapsulation is based on [IEEE 802.3] and is described in clause 7.4.1 of ITU-T G.993.5 and shown in FIG. 5.

The VCE MAC Address field contains the VCE MAC Address as configured by the VCE through O-PMS, see clause 10.5.2.1 of ITU-T G.993.5. The protocol payload data contains the Line_ID (as configured by the VCE through O-PMS, see clause 10.5.2.1 of ITU-T G.993.5), the Sync Symbol Count (as defined in clause 7.2.4 of ITU-T G.993.5), the Segment Code (as defined in [ITU-T G.993.2]) and the backchannel data ERB (as defined in clause 7.2.3 of ITU-T G.993.5). The Length field equals the length of the protocol payload data, increased with the 8-byte LLC SNAP header length, and shall not exceed 1024+8=1032. If the protocol payload data exceeds 1024 bytes, the backchannel data ERB is segmented as defined in clause 11.2.3.1 of [ITU-T G.993.2]. For protocol payload data lengths shorter than or equal to 1024 bytes, the backchannel data ERB may also be segmented. If segmented, each segment of the backchannel data ERB is Layer 2 Ethernet encapsulated as shown in FIG. 5, with the number of segments per backchannel data ERB not exceeding 16.

As described in detail above, reporting of the normalized error samples on probe tones of sync symbols is provisioned in G.993.5. As set forth previously, according to aspects of the invention, the availability of this data across the whole frequency band, at a rate which can equate to up to the sync symbol rate allows new diagnostic feature development.

Figure 6:
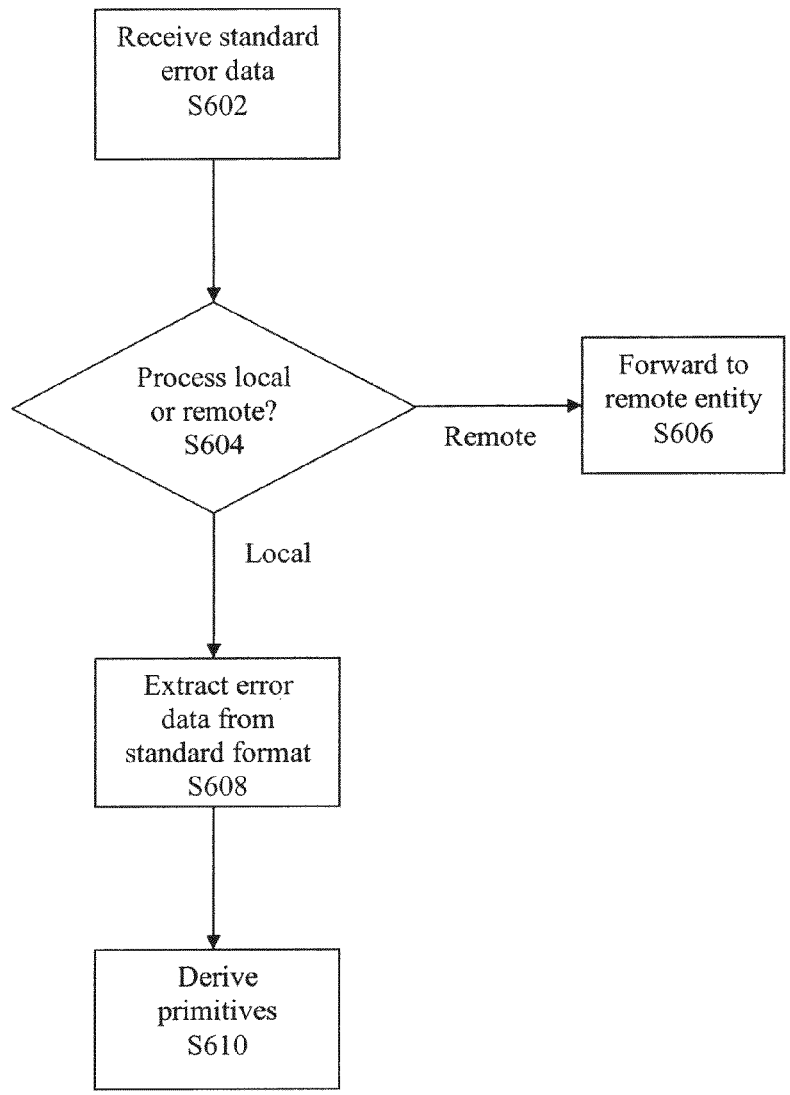
FIG. 6 is a flowchart illustrating an example methodology for using standard error data according to embodiments of the invention.

FIG. 6 is a flowchart illustrating an example methodology for using standardized error data such as the normalized error samples on probe tones of DSL sync symbols as provisioned in ITU-T G.993.5 in accordance with embodiments of the invention. This methodology will be described with reference to an example of the method being performed in a VTU-R in a DSL system. Note, however, that the invention is not limited to this example type of standard error data or environment. Moreover, although only the use of downstream error data is shown in these examples, it is possible that upstream error data could also be used.

As shown in FIG. 6, the standard error data is received in step S602. In a G.993.5 ERB example, this occurs at every sync symbol interval, and the error data is received from a G.993.5 compliant processing stack. This standard stack typically encapsulates and reports the error data to the VCE in accordance with ITU-T G.993.5 as described above. In one possible embodiment, the stack is modified so as to forward the data to a local process as well. The entity receiving the data in step S602 can be the VTU-R or a VCE. It should be noted that with other types of error data, whether standard or proprietary, the data may be received more frequently or less frequently than every sync symbol.

Next, in step S604, the receiving entity determines whether the data is to be further processed locally or remotely. This step need not always be performed if the receiving entity is programmed to always do one or the other by default. Moreover, it is possible for processing to be performed both locally and remotely.

If the data is to be processed remotely, in step S606 the receiving entity forwards the data to the remote entity. This step can include performing additional or alternative encapsulation of the data, as will be described in more detail below. The remote entity can process the data fully or partially and/or forward the data to yet another entity.

If the data is to be processed locally, in step S608 the error data is extracted from the current encapsulation. This step will vary based on the type of standard data to be processed, as well as the type of encapsulation. Example extraction techniques for example types of data will be described in more detail below.

Processing of the extracted error data is performed in step S610. For example, new primitives are derived from the extracted error data, and various examples will be described in more detail below.

As set forth above, and as mentioned in connection with step S606 above, the use and processing of standard error data does not need to be performed in a VTU-R. For example, the present inventors recognize that the ability to use standardized error data such as the ITU-T G.993.5 ERB packets enable the processing on standardized packet formats that are independent of each PHY layer device. As such, an analysis engine built using these ERB packets as its input can be agnostic of the type of PHY layer device from which they originated.

As currently specified in ITU-T G.993.5, the ERB packet can be embedded into an LLC-SNAP encapsulated packet which is then placed within a standard Ethernet [IEEE802.3]

frame. In ITU-T G.993.5, the destination MAC address must be that of the VCE and the source MAC address is that of the VTU-R. Accordingly, this encapsulation dictated by ITU-T G.993.5 assumes that the VCE is available on the same L2 network as the VTU-R and does not envisage any other implementation.

However, the present inventors recognize that an Analysis Engine for processing ERB data according to aspects of the invention does not necessarily need to be on the same L2 network. The present inventors further recognize that the Analysis Engine can be (a) an expensive resource—in terms of the processing capacity required, (b) something that would continuously change as new algorithms for extracting additional information become available, (c) holds proprietary software and know-how and needs to be secured, and (d) would have a very small utilization if it is tied to a single line. Accordingly, embodiments of the invention have the Analysis Engine be a centralized resource that is shared across a large number of end-customer-lines, rather than being instantiated on individual CPE's.

Further, users such as Service Providers are likely to prefer having a single Analysis Engine so that it is (i) easier to version-control, and (ii) possible to re-run historical measurements through newer versions of the Analysis Engine software.

Accordingly, aspects of the invention include communicating standard error data such as ERB packets among different devices (other than between a VCE and VTU-R in ITU-T G.993.5) and processing the data at devices that may be remote from the VCE and VTU-R. These and other aspects of the invention will now be described in more detail in connection with ERB data as provisioned in ITU-T G.993.5. However, the invention is not limited to this example type of error data. For example, although the discussions below use the terms "standard error data" such as "ERB," the invention can be applied to non-standard error data/ERB (i.e. data not defined in a standard such as G.993.5), and so the use of such non-standard error data is also within the scope of the present invention. A non restrictive example of "non-standard error data" is the error data collected on sliced data symbols (as opposed to sync symbols), which can be encapsulated in a format similar or different to that of the ERB data format. Another example of error data is the received complex data sample Z itself normalized or not to the 4-QAM constellation point, in the absence of a reference transmitted symbol. These two examples of "non-standard error data" are equivalent to the standard error data collected on sync symbol (ERB) in that they consist of the same noise samples that are intended to be collected, whether the transmit symbol is known (synch symbol), unknown (data symbol) or absent (quiet).

As described in detail above, ITU-T G.993.5 defines encapsulating ERB data in a Bridged Ethernet packet—this is the packet that needs to be transported to/from the VCE. With this type of encapsulation, further communicating the encapsulated ERB data outside of the local network between the VCE and VTU-R could be done in multiple ways—Tunneling and Proxying.

Tunneling by itself is not a new concept. Different kinds of tunnels are possible within embodiments of the invention and two non-limiting examples are given below.

MAC-in-MAC: If the VCE exists on another LAN—it is possible to implement Q-in-Q (as specified in IEEE 802.1d) and pass it over an Ethernet Virtual Circuit (EVC)—as defined by Circuit-Emulation-Service-over-Ethernet (CE-SoE) by the Metro Ethernet Forum (MEF-3).

Tunnel Ethernet frame over IP networks: The Ethernet frame could be suitably encapsulated within an IP packet. The IP DA would be the address of the VCE on the network that it exists in (this could either be configured or looked up via DNS). This packet would then be routed to this IP DA to reach the IP DA in the target network.

Figure 7:
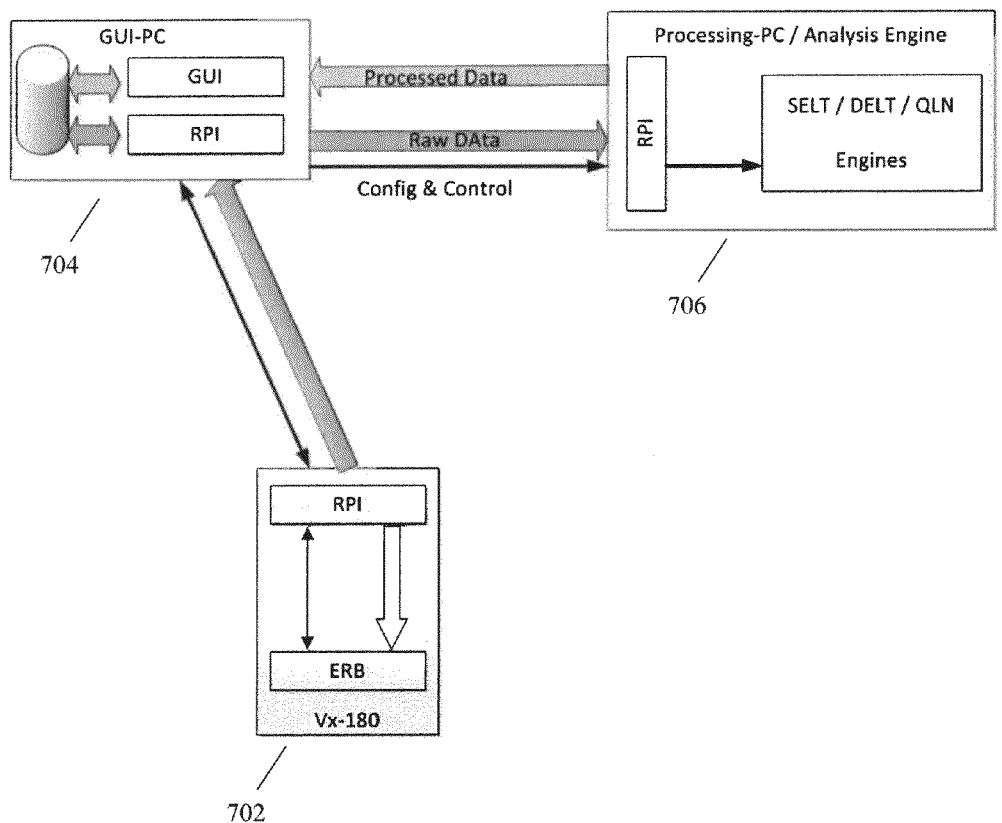
FIG. 7 is a block diagram illustrating the communication of standard error data in a network in one embodiment of the invention.

FIG. 7 illustrates the process by which L2 ERB packets are retrieved from a target platform 702 (e.g. a Vx180 CPE card from Ikanos Communications Inc. in a DSL modem), alongside other standardized data, to an external Control Processing and Database Unit 704 (e.g. a PC in a Network Operations Center having a GUI). The L2 ERB packets may be forwarded to a third processing entity 706 (e.g. a Processing-PC) either directly or via tunneling, which extracts the normalized error data and processes it in order to derive new diagnostics primitives such as those to be described in more detail below, alongside other primitives, as a part of a complete analysis engine (i.e. SELT (single-ended loop testing)/DELT (dual-ended loop testing)/Quiet Line Noise Engines).

FIG. 7 illustrates the versatility of this embodiment of the invention, where derivation of the primitives based on the L2 ERB data can effectively take place external to the target platform 702, due to the standardization of the error data in a L2 Ethernet packet that can be forwarded to any external processing entity. In the figure, RPI refers to a Raw-to-Processed interface that allows encapsulated ERB data to be communicated via a network protocol, such as in Ethernet and/or IP packets. As further shown in the figure, in this example, the processing PC 706 (e.g. a remote processor) performs the processing for computing the diagnostic primitives, which are then communicated back to GUI-PC 704 for access and display to an operator, for example.

Alternatively to the configuration shown in FIG. 7, the control Processing Unit 704, and Processing Entity 706 can be instantiated on a single processor, such as a Gateway host processor as implemented by a Smart CPE from Ikanos Communications Inc. Another embodiment can be realized where the control and processing entities 704 and 706 are embedded in a VCE processor to which L2 ERB packets are already directed for self_FEXT cancellation. Yet another embodiment can be realized where the VCE processor, which receives the L2 ERB packets for self_FEXT cancellation, redirects those packets to an external processing unit 706, by changing the destination MAC address in order to perform the diagnostics on a remote processing device, such as a Network Management System. Note that either one or both of the processing devices—the GUI-PC and the Processing-PC—can be instantiated as standalone machines or as cloud-based services.

Figure 8:
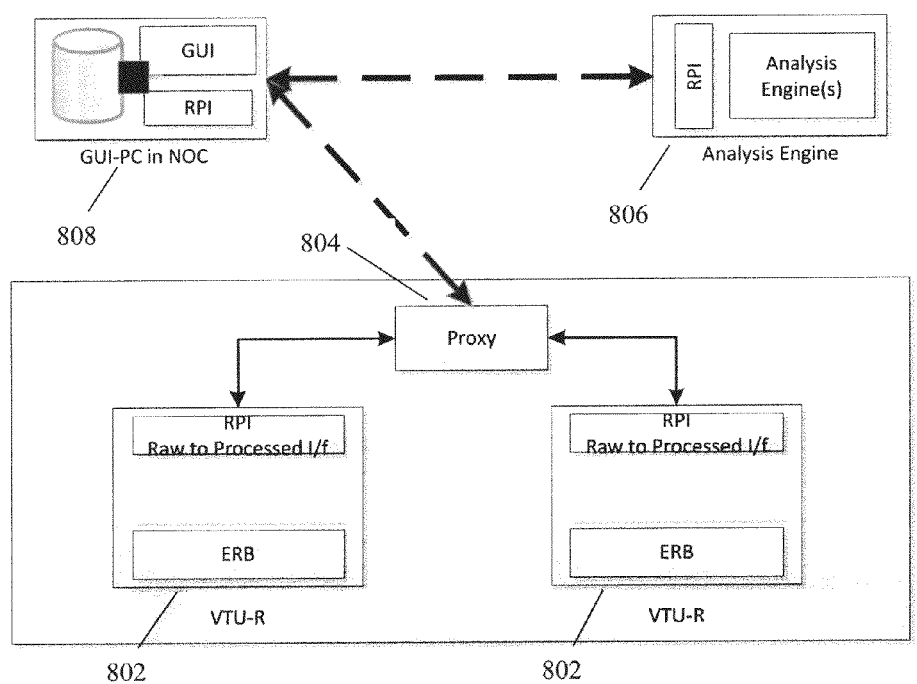
FIG. 8 is a block diagram illustrating the communication of standard error data in a network in another embodiment of the invention.

In additional or alternative embodiments, a proxying can be used. In this case, the assumption is that a third device/node acts as a "proxy" for the node that is generating the data—either because the VTU-R is incapable of supporting a full TCP/IP stack or because the proxy provides additional functionality. An example of this embodiment of the invention is shown in FIG. 8.

In this case, the VCE-MAC-address in the Ethernet-frame specified by G.993.5 is instead set by the VTU-R 802 to the MAC-address of a proxy-device 804. This proxy device (a) receives the Ethernet frame from the VTU-R, (b) acts as a "proxy" for one or more VTU-R's 802, (c) may support a TCP/IP stack (either fully capable of performing IP lookup and routing, or simply capable of creating an IP frame and forwarding to an IP router), and (d) sends and receives frames to/from the actual VCE using Tunneling (as described above). The proxy device may be implemented using a processor that is located at the same CO as the VCE. However many other alternatives are possible, for example the device could be a standalone device, a home gateway/home router, etc.

Note that where Tunneling is used directly (without a proxy)—the correct MAC-address of the VCE (on whatever remote network the VCE exists on) needs to be known. If the MAC address is not known/incorrectly coded—the packet will end-up in a node that might not understand what to do with the received frame.

In the Proxy scenario, the Proxy 804 and the VTU-R 802 are assumed to be on a single physical network and within the same administrative-domain. Having the MAC-address of the proxy being configured into the VTU-R could therefore be a one-time operation, and not unrealistic (although still not the preferred mechanism).

The relationship between a Proxy and a VTU-R need not be exclusive. For example, a VTU-R may send its data to the "associated" VCE and also copy it to a designated Analysis Engine 806 (possibly using bridging or tunneling—as appropriate). It is also possible that the VTU-R sends its data to the VCE which then forwards it to the Analysis Engine 806.

The Proxy device 804 could provide additional value in a variety of manners. Some examples are: (a) acting as a proxy for multiple VTU-Rs (it could use the MAC-SA to identify various nodes), (b) do additional processing (e.g., security/encryption etc.), or re-format the data to meet the requirements of the Analysis Engine, (c) communicate with multiple Analysis Engines keeping track of the "active" and "backup" Analysis Engines, (d) replicate the error data to multiple entities—for example to an Analysis Engine and a VCE, (e) historical data-gathering and historical data-analysis etc.

The GUI-PC 808 is typically located in a Network Operations Centre (NOC) run by a Service Provider. In example embodiments, when a customer reports a problem, the Service Provider triggers the capturing of error-data from this entity. The error data is reported to the NOC which might save the error-data as well as the primitives (processed data) in a local database. The NOC would then send the error-data off to the Processing-PC which hosts the Analysis Engine (note that the Analysis Engine may be co-located with the GUI-PC at the NOC). The Analysis Engine sends the processed data (primitives) back to the GUI-PC at the NOC.

Figure 9:
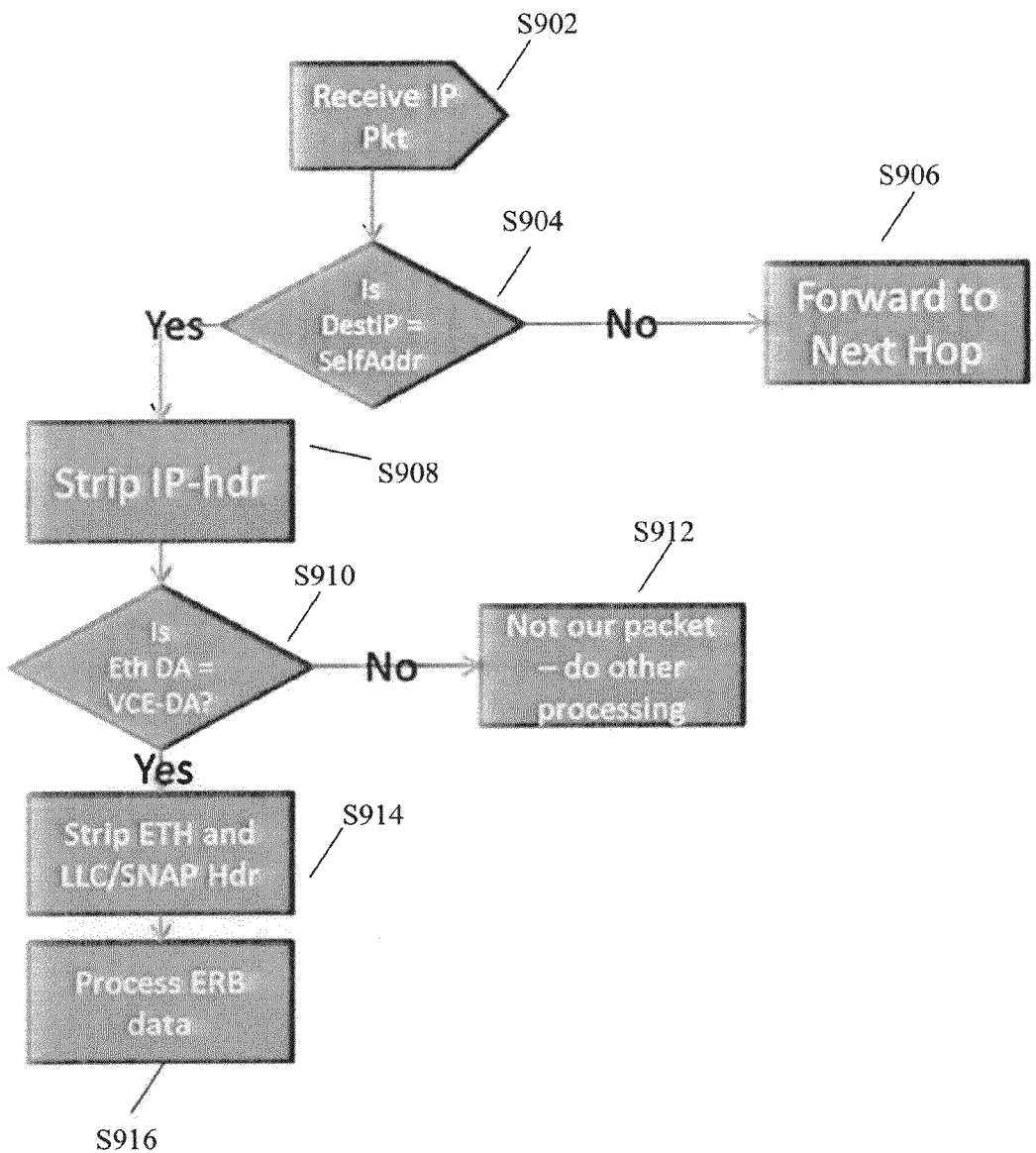
FIG. 9 is a flowchart illustrating an example method for the communication and use of standard error information in a network according to an embodiment of the invention.

An example methodology for performing steps S602 to S610 with IP encapsulated ERB data in accordance with ITU-T G.993.5, and in a processing PC of a "tunneling" embodiment such as that shown in FIG. 7, is described in alternative detail in FIG. 9.

As described above, in the "tunneling" embodiment, the encapsulated ERB data is further encapsulated in IP packets and communicated over a network via TCP/IP. Accordingly, when such a packet is received in step S902, the destination IP address is checked in step S904. If the destination IP address of the packet is not that of the processing PC, the packet is forwarded on to the next hop in step S906 in the conventional manner. Otherwise, processing proceeds to step S908, where the IP header is stripped, leaving the Ethernet encapsulated data such as that defined in ITU-T G.993.5. Next, in step S910, the MAC destination address is checked to see whether the VCE associated with the VTU-R is one for which processing is to be performed by this processing PC. If not, the packet is dropped in step S912. Otherwise processing proceeds to step S914 where the Ethernet and LLC/SNAP headers are stripped, and then to step S916 where the error data is extracted and processed, as in steps S608 and S610 of FIG. 6.

An example methodology for extracting encapsulated error data from an ERB defined in ITU-T G.993.5, and performed in step S610 of FIG. 6 or step S916 in FIG. 9 will now be described in more detail, in connection with ERB formatted data corresponding to one sync symbol. The output of this process is normalized error samples in the frequency domain.

The process begins by removing the first byte of ERB_ID from the input ERB data. The rest of the data is segmented into Nb vectored band blocks (VBB).

For each VBB the following processing is performed: Remove first byte of VBB_ID; Compute mean error value from next 12-bit VBB_Aux, if F_Block is greater than one; and Segment the rest of data into error blocks. Then for each error block in the VBB: Extract the 4-bit B_M, the highest bit index of the error samples in this block; Extract I/Q components of error samples successively by applying B_M; and Save the real and imaginary parts of error samples into memory.

After all blocks of each VBB has been processed per the above, the ERB formatted data will have been fully converted into normalized error samples in the frequency domain. It should be noted that the receiving entity of ERB data needs to know or be told the encoding configuration parameters of the data, alongside the ERB data, such that the decoding process can be performed remotely.

As described above, according to aspects of the invention, the availability and ability to communicate the normalized error samples in the formatted ERB allows for the computation of new and useful diagnostic information and primitives, for example as indicated in connection with step S610 in FIG. 6 and step S916 in FIG. 9. Some example primitives and how they are derived are provided below. However, the invention is not limited to these examples.

1. Disturber's PSDs (XPSD(f)) & FEXT Coupling Derivation:

XPSD(f) derivation is obtained by cross-correlating the received normalized error on probe tones with orthogonal sequences of possible disturbers impacting the DS band over the orthogonal sequence length. This cross-correlation can also be used to identify self-FEXT coupling, as seen by the victim receiver, assuming a certain transmit PSD of the disturber, such as the one used by the victim itself.

In practical scenarios, tracking/monitoring the self-FEXT coupling and/or disturber's PSDs helps appreciate cable loads, presence or absence of disturbers, joining events, severity and evolution of the coupling characteristics of the cable, and variation of disturber's psds. FEXT couplings and disturber's PSDs can be ordered in terms of magnitude and the number of dominant Xtalk per band or per tone can be determined.

In case of one dominant Xtalk the knowledge of XPSD and FEXT coupling can also help to determine the correction to the computed SNR margin per bin figure derived, which is based on the wrong assumption that the disturber impact is Gaussian.

In one example embodiment, the derivation of these per bin PSD values is done according to the following process:

For each sequence of error samples for each bin during the duration of the orthogonal sequence T, perform the correlation with the orthogonal sequence related to a potential disturber:

$$\rho_{n,m} = \frac{\frac{1}{T}\sum_{t=0}^{T-1} e_n[t] x_m^*[t]}{\sigma_x^2}$$

where n is the victim user and m is each of the N disturbers in the system, $e_n[t]$ is the normalized error sequence (synch symbol error and/or derived from the ERB packet) $x_m[t]$ is the orthogonal sequence associated with user m.

This correlation is done over one or more periods of orthogonality to reduce the impact of additive noise, and is then referred to the line.

2. SNR and Line Referred Noise:

The variance of the per-tone normalized error over consecutive error frames allow for a robust SNR estimate and evolution of the noise seen by the receiver. As opposed to SNR measurements performed on the errors collected for data symbols, error data collected on Sync symbols (which is a T×4-QAM data sliced with or without reference of the transmit data) allows derivation of a robust and accurate SNR, even in the presence of line degradation that may lead to slicer decision errors occurring on data symbols and therefore, a biased or inaccurate SNR report.

The new SNR primitive derived from the synch symbol error, referred to as SSNR, is the inverse of the per bin average of the power of the error over a certain period of time, and is computed as follows:

$$\sigma_e^2 = \frac{1}{T}\sum_{t=0}^{T-1} e_n[t]e_n^*[t]$$

where $e_n[t]$ is the normalized error sequence (synch symbol error and/or derived from the ERB packet).

3. Fext-Free and Background Noise Measurement

Combined with a correlation over successive orthogonal sequence lengths to eliminate known crosstalk disturbers, the average of the noise power provides a self-FEXT free (AWGN background) noise equivalent figure of merit on the line. Alternatively, the elimination of the self-FEXT disturbers on the error data signals can be performed after identification of the FEXT cross-coupling, such that SNR can be derived on self-FEXT free error samples, representative of the background noise. Together with the identification of the dominant disturbers and their strength ranking, a capacity reduction estimate due to their presence can then be processed.

The FEXT free SNR primitive derived in the presence of the xtalk is a projection of the SNR estimate that could be achieved in the absence of the identified crosstalker. It matches the actual SNR measured in datamode on data symbols after removal of the disturber. The FEXT free SNR primitive derived from the synch symbol error referred to as FFSNR, is the inverse of the per bin average of the power of the error over a certain period of time, after subtraction from this error of the estimate of the impact of the crosstalk given known data transmitted and estimate of the xtlak coupling channel, and is computed as follows:

$$\sigma_e'^2 = \frac{1}{T}\sum_{t=0}^{T-1} e_n'[t]e_n'^*[t]$$

where $e_n'[t]$ is the fext free error sample derived from the normalized error sequence $e_n[t]$, according to the following process:

$$e_n'[t] = e_n[t] - \sum_{m=1}^{N-1} \rho_{n,m}[t]x_m[t]$$

where $x_m[t]$ is the orthogonal sequence associated with user m. The predicted error $e_n'[t]$ is done for all N disturbers of index m affecting the victim user n for all victim tones.

4. Histogram and Moments of Noise Distribution on Individual Carrier Basis

Histograms and information about distribution of error data on an individual carrier basis with or without FEXT compensation allow for evaluation of the statistical properties of the underlying background noise. Such ability can help diagnose the impact of some non-Gaussian noise contribution such as impulse noise, which may limit the stability of the system. Currently the second-order moment is computed, with the assumption that the additive noise is zero-mean and Gaussian. Deviation from this model is likely, for example when noise from non-linear sources impact the receiver. Mean, kurtosis, skewness and higher order moments (referred to as STATSN) can easily be derived on a per-tone basis based on the normalized error samples to complement the variance currently computed to better qualify noise sources.

As an example, the following information can be extracted from the various moments derived from the error data collected on the sync symbol/ERB packet:

Real & Imaginary Line Noise Gaussian density probability properties—If the line noise is not Gaussian (kurtosis not equal to zero, based on defined threshold), the Gaussian assumption of the noise impacting the receiver is not valid. Compensation can then be provided to SNR measurements and other metrics currently derived from the variance of the error.

Real & Imaginary Line Noise Independent and Identically Distributed Properties (I.I.D.)—If the noise is not I.I.D, the SNR Margin estimation is not valid and the SNR margin could be biased. A correction factor can then be provided; If Mean is constant, and based on particular signature of the disturbance, the presence of a strong FEXT, NEXT or RFI can be identified. If the SNR margin or line quality measurement algorithms are biased because of the presence of this mean component, the figure of merit could be compensated for the presence of a non zero mean; Based on the variance shape, an estimate of the noise level, RFI position, Crosstalk presence, Common mode noise leakage, Echo, etc. can be determined; A large peak of variance and kurtosis beyond threshold levels is a sign of RFI presence 5. Correlation Between Adjacent Tones Correlation of the normalized sync symbol errors, across adjacent or non-adjacent tones, with the transmit reference symbol or with normalized sync symbol errors from other tones yields a metric that helps determine the composition of certain noise sources. For example: At the edge of the US/DS band, correlation of symbol errors can indicate the presence of linear or non linear echo; In band, correlation of symbol errors can indicate the presence of non linearity or Inter Symbol Interference, or Inter Channel Interference; At the edge of the RFI band, correlation of symbol errors can indicate the presence of RFI or non linearity.

6. Evaluation of Transmitter Non-Linearity

Transmitter US non-linearity can be evaluated by correlating the transmitter signal on selected US tones having index #n with the error signal received on DS received tones indices #2n or #3n depending on the type of non-linearity observed (i.e. 2nd order or 3rd order, . . . ). This is achieved by correlating the known data modulated by the transmitter, at a particular frequency, with the error collected as part of the sync symbol error or ERB data collection.

An example process of deriving the example primitives described above, and as performed in step S610 of FIG. 6 and/or step S916 of FIG. 9 will now be described in alternative detail in connection with FIG. 10. It should be noted that the number and type of derivations performed and the sequence shown in FIG. 10 provided for illustration only, and that many alternatives and additions are possible.

Figure 10:
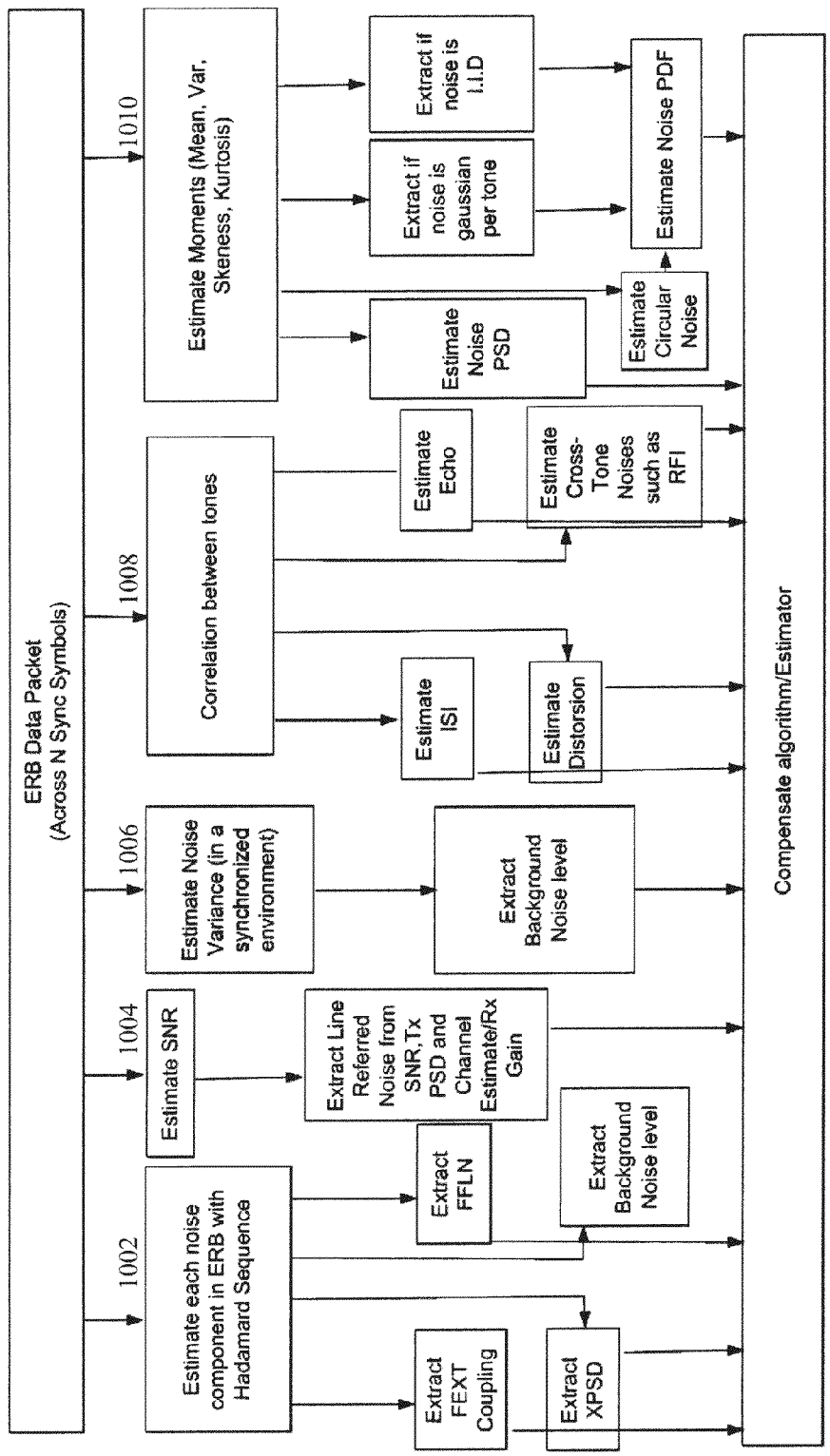
FIG. 10 is a process flow diagram illustrating an example of the derivation of diagnostic primitives according to an embodiment of the invention.

As shown in FIG. 10, after the ERB data packet has been received and the normalized error samples are obtained, a number of derivations can be performed.

In a first path, 1002, Xlog/Xlin Estimation is performed according to the following pseudocode:
  Collect ERB across N Synch Symbols
  Decode ERB—Extract I/Q component of error samples
  Correlate Error sample with Reference FEXT ID sequence.
  Compute XPSD and FEXT coupling for each FEXT ID sequence by referring back to line
  Interpret XPSD and FEXT coupling
In this path 1002, noise PSD Estimation is also performed according to the following pseudocode:
  Collect ERB across N Synch Symbols
  Decode ERB—Extract I/Q component of error samples
  Correlate Error sample with Reference FEXT ID sequence
  Calculate PSD for each FEXT ID Sequence by referring back to line
  Interpret PSD
In path 1002, FFLN Estimation is also performed as follows:
  Collect ERB across N Synch Symbols
  Decode ERB—Extract I/Q component of error samples
  Correlate Error sample with Reference FEXT ID sequence.
  Compute FEXT channel for each FEXT ID sequence
  Calculate FEXT free error samples by removing Xtalk from every sync symbol, subtracting from the error samples each FEXT ID Sequence multiplied by the FEXT channel associated with it
  Compute FEXT Free error power and FEXT Free SNR
  Compute FEXT Free Line Referred Noise (FFLN) by referring back to the line
  Interpret FFSNR and FFLN
In path 1002, Background noise level is estimated as follows:
  Collect ERB across N Synch Symbols
  Decode ERB—Extract I/Q component of error samples
  Estimate the variance on error samples across a multiple of Hadamard sequence length
  Estimate PSD from noise variance (PSD=10 log 10(VAR))
  Interpret background noise PSD
In a next path 1004, SYNSNR & SYNCLN Estimation is performed according to the following pseudocode:
  Collect ERB across N Synch Symbols
  Decode ERB—Extract I/Q component of error samples
  Calculate sync error power for each sync symbol
  Calculate sync SNR
  Calculate sync Line Referred Noise (SyncLN) by referring back to line (through gains)
  Interpret Sync SNR and Sync LN
In a next path 1006, Background Noise Variance in a synchronized FEXT Noise environment is derived as follows:
  Collect ERB across N Synch Symbols
  Decode ERB—Extract I/Q component of error samples
  Estimate the variance on error samples
  Estimate PSD from noise variance (PSD=10 log 10(VAR))
  Interpret background noise PSD
In a next path 1008, ISI Estimation is performed according to the following pseudocode:
  Collect ERB across N Synch Symbols
  Decode ERB—Extract I/Q component of error samples
  Estimate correlation between a reference transmit constellation point on tone Q and the error of n adjacent tones in DS band
  If correlation is above threshold, flag as ISI
  Interpret ISI level
In path 1008, Echo/Distortion Estimation is also performed as follows:
  Collect ERB across N Synch Symbols
  Decode ERB—Extract I/Q component of error samples
  Estimate correlation between a reference transmit constellation point on tone Q in US band and the error of n adjacent tones in DS bandIf correlation is above threshold, flag as Echo/Distortion
  Interpret Echo/Distortion level
In path 1008, Cross Tone Noise Estimation is also performed as follows:
  Collect ERB across N Synch Symbols
  Decode ERB—Extract I/Q component of error samples
  Estimate cross correlation between N adjacent tones If cross correlation is above threshold and no ISI detected, flag as Noise presence
  Interpret Noise level
  If process can be done independently and/or jointly on real/imaginary part of each tones:
In a next path 1010 a number of derivations are performed. First, Moments Estimation is performed according to the following pseudocode:
  Collect ERB across N Synch Symbols
  Decode ERB—Extract I/Q component of error samples
  Process real and imaginary part independently:
    Compute Mean
    Remove Mean from error
    Compute Variance, Skewness and Kurtosis
    interpret Moments
In path 1010, Noise PSD Estimates are performed as follows:
  From variances for real and imaginary parts, estimate PSD of noise.
In path 1010, Circular Noise Nature is estimated as follows:
  Collect ERB across N Synch Symbols
  Decode ERB—Extract I/Q component of error samples
  Estimate Moments for real and imaginary parts of the symbols
  Compare real and imaginary Moment(s)
  If Moment(s) is/are identical flag as circular Noise
  If Moment(s) is/are different flag as Non circular Noise
  Interpret Results
In path 1010, Gaussian Noise Nature Estimates are derived as follows:
  Collect ERB across N Synch Symbols
  Decode ERB—Extract I/Q component of error samples
  Estimate Moments independently for real and imaginary part
  If both Kurtosis are below threshold, flag as Gaussian Noise
  If at least, one of the two Kurtosis is above threshold, flag as non Gaussian Noise
  If Noise is non Gaussian, Estimate independently for real and imaginary parts the Noise PDF according to moments or by matching other probabilistic law
  Interpret Results
In path 1010, I.I.D Noise Nature is estimated as follows:
  Collect ERB across a first set of N Synch Symbols
  Decode ERB—Extract I/Q component of error samples
  Estimate Moments of first set
  Collect a new set of ERB across N Synch Symbols Decode ERB—Extract I/Q component of error samples
Estimate Moments of new set
Compare Moment(s)
If Moment(s) is/are different flag as Non identically distributed Noise
Calculate Correlation between errors of received symbols of a same set
If correlation is above threshold, flag as Non Independently Distributed
If Moment(s) is/are identical and correlation is below threshold flag as I.I.D Noise
If noise is flagged as non I.I.D, estimate noise PDF for the different instance of the noise
Interpret Results FIGS. 11 through 15 illustrate the possible metrics derived from the normalized synch symbol error or corresponding ERB blocks or L2 Ethernet encapsulation of the backchannel data according to embodiments of the invention.

Figure 11:
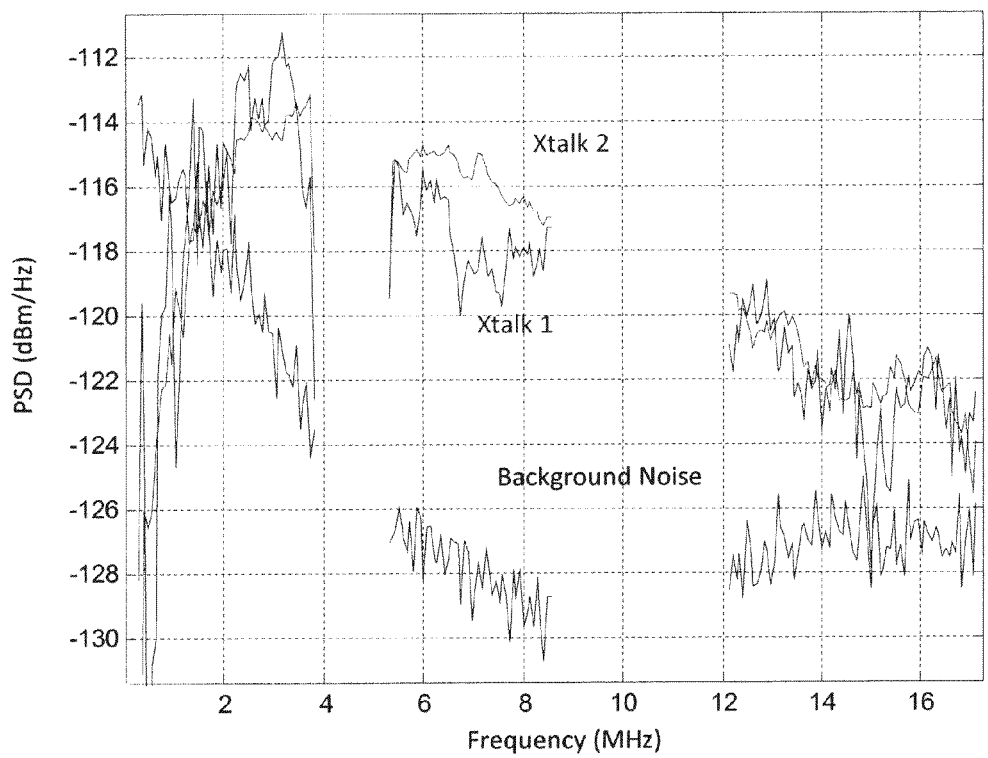
FIGS. 11 to 15 are diagrams illustrating example primitives computed from L2 ERB according to embodiments of the invention.

FIG. 11 illustrates the PSDs estimated from two crosstalk disturbers, as well as an estimate of background noise. The Noise PSDs are estimated per disturber and through correlation with the Hadamard sequences, and then referred to the line, as illustrated in path 1002 of FIG. 10.

Figure 12:
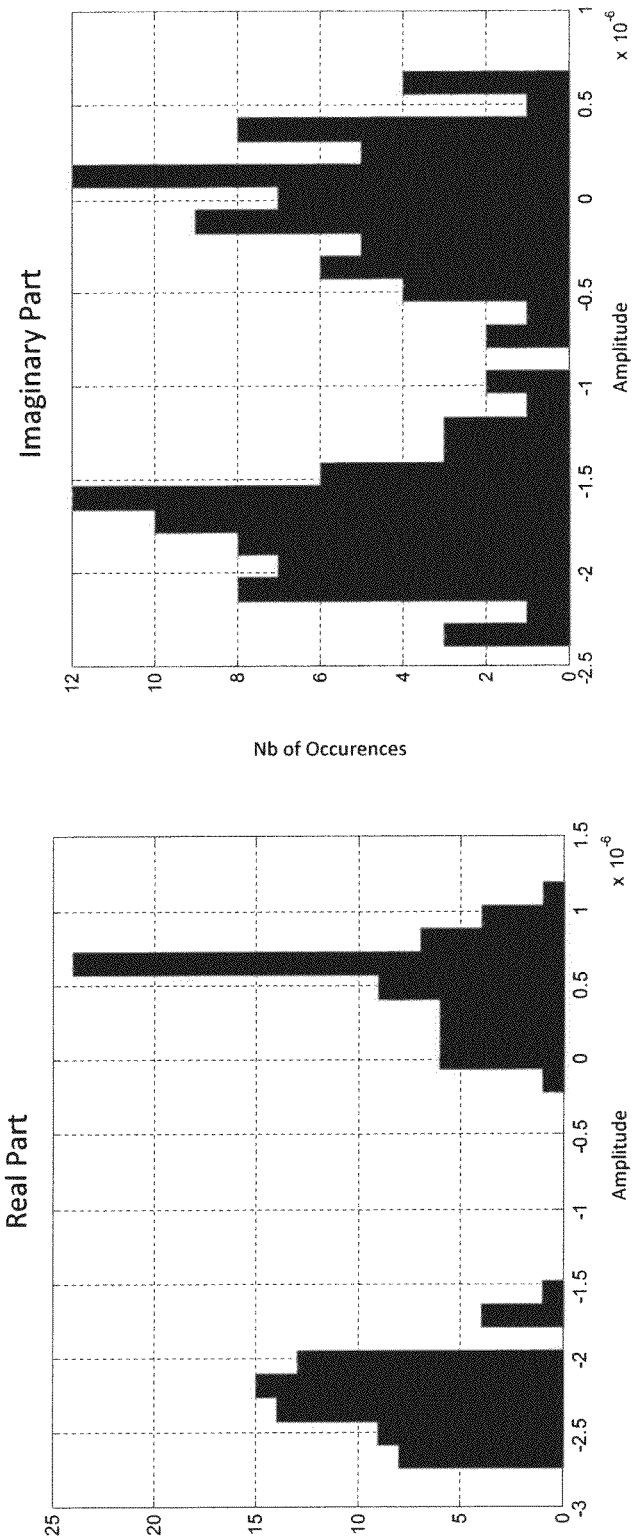

FIG. 12 illustrates histograms/PDFs of the real and imaginary parts of crosstalk noise. In this example, these are calculated based on ERB data collected across N=128 sync symbols and the noise PDF can be estimated and matched. In this example, a mixture of Gaussian on the two crosstalk disturbers can be observed, as illustrated in the process 1010 of FIG. 10.

Figure 13A:
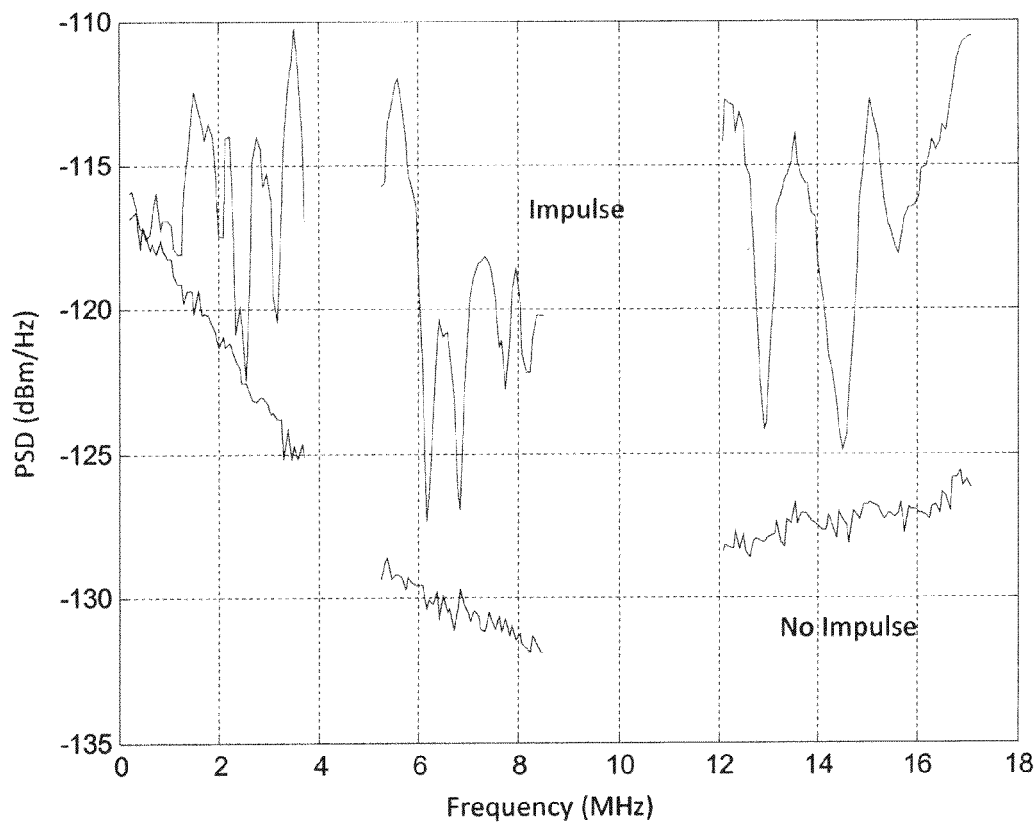
Figure 13B:
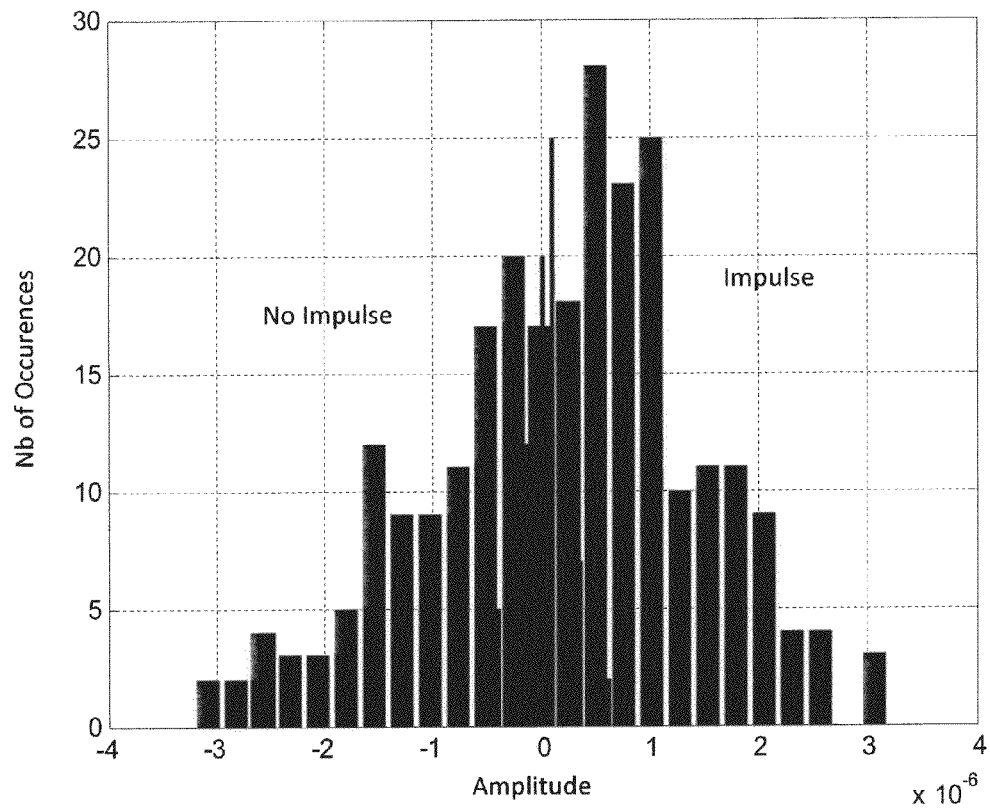

FIGS. 13A and 13B illustrate the computed PSD and the PDF estimates of a noise at 6 MHz with and without REIN impulse noise, as illustrated in the process 1010 of FIG. 10.

Figure 14A:
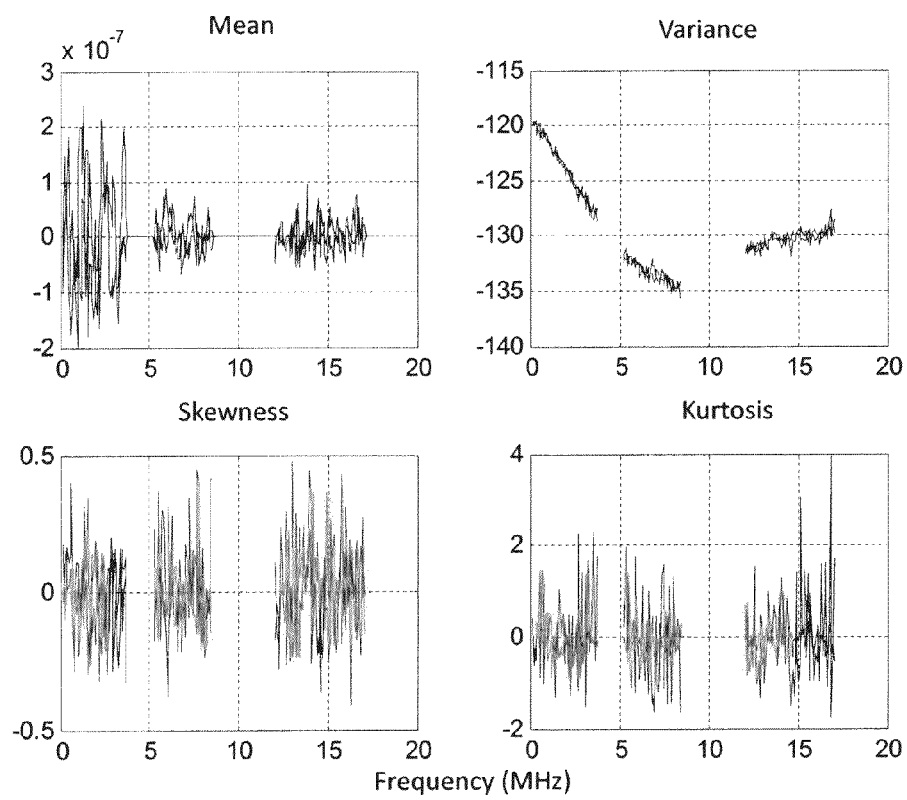
Figure 14B:
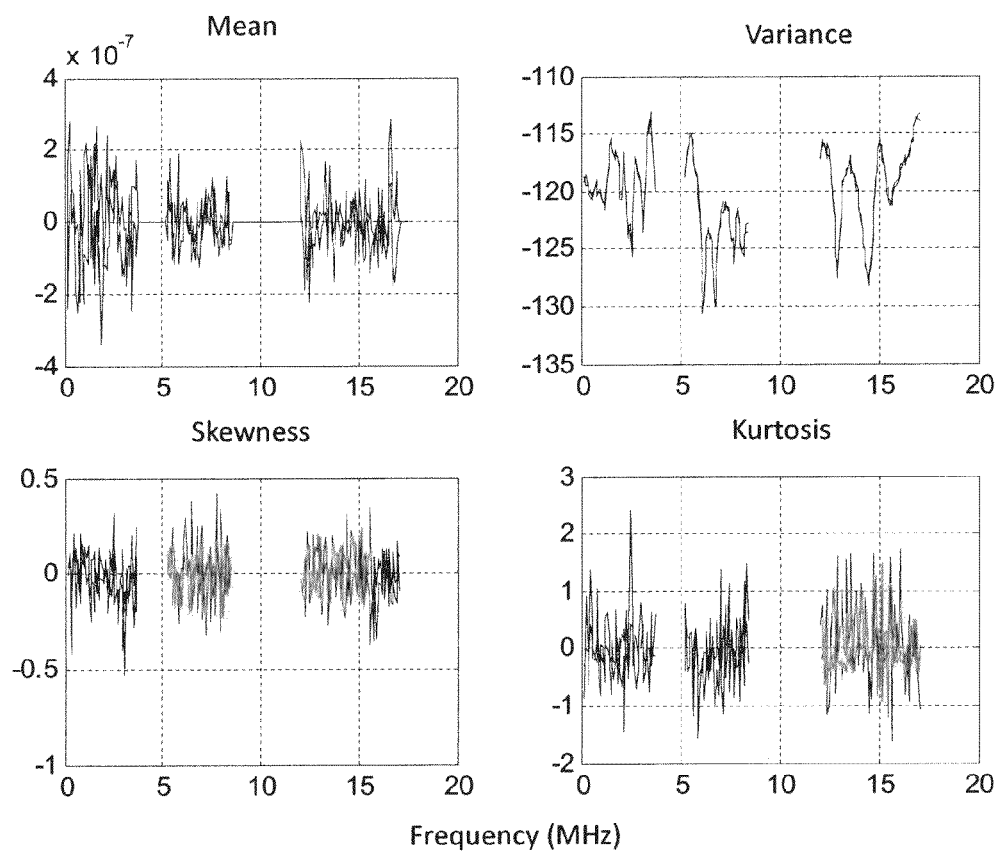

FIGS. 14A and 14B illustrate computed noise moments without and with impulse noise, respectively, as illustrated in the process 1010 of FIG. 10.

Figure 15:
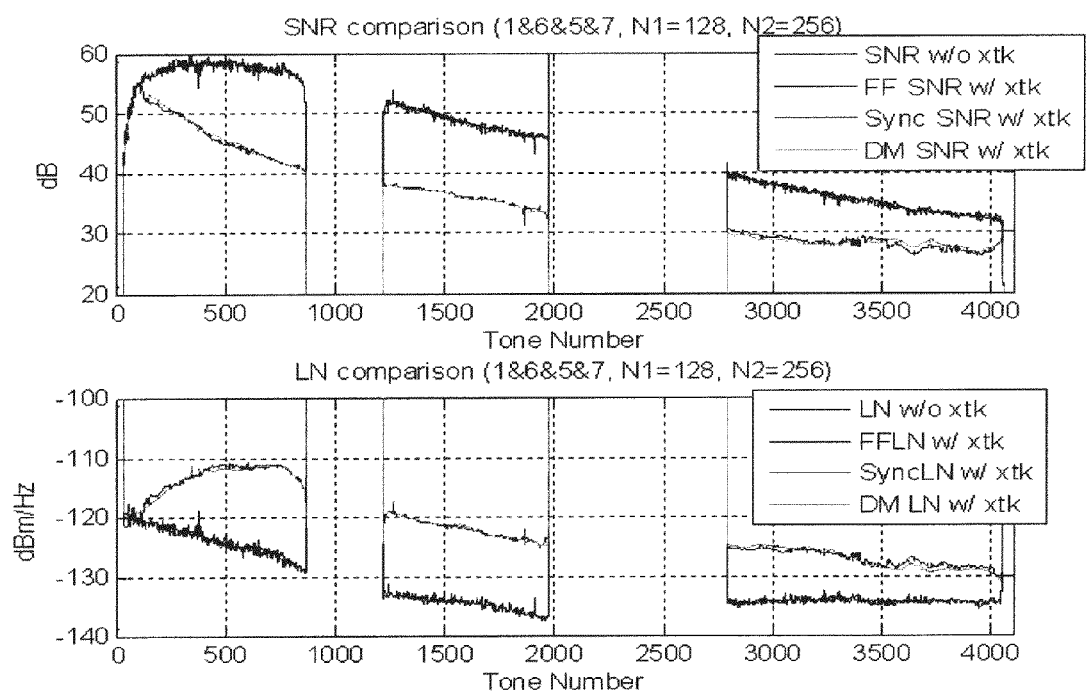

FIG. 15 illustrates the derivation of the FF SNR and Synch SNR and corresponding FFLN and Synch LN, as illustrated in the process 1002 of FIG. 10.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method implemented in a communications system, comprising:
periodically sending sync symbols in a path in the communications system;
periodically receiving error packets containing error data that is calculated based on the sent sync symbols, the error data thereby characterizing line conditions in the path, wherein the error data comprises normalized error data samples; and
monitoring the line conditions using the received error packets, the monitoring being performed by one or more of customer premises equipment (CPE), a vector control entity (VCE) and a diagnostics application that is remote from the CPE and VCE.

2. The method of claim 1, where monitoring line conditions comprises deriving diagnostic physical (PHY) layer primitives from the error data in the error packets.

3. The method of claim 2, wherein the error data comprises normalized error data samples.

4. The method of claim 3, wherein the error packets comprise ERB as provisioned in ITU-T G.993.5.

5. The method of claim 1, wherein the error packets comprise ERB as provisioned in ITU-T G.993.5.

6. The method of claim 1, wherein the communications system is a very high bit rate digital subscriber line (VDSL) system.

7. The method of claim 6, wherein the path is a downstream path.

8. The method of claim 1, wherein the path is a downstream path.

9. The method of claim 1, further comprising forwarding the error packets to the remote diagnostics application via a network.

10. The method of claim 9, wherein forwarding comprises Ethernet tunneling.

11. The method of claim 9, wherein forwarding comprises proxying.

12. The method of claim 11, wherein proxying includes encapsulating the error packets in an IP frame.

13. The method of claim 1, wherein monitoring includes:
extracting normalized error samples from the error packets; and
processing the normalized error samples to derive one or more diagnostics primitives.

14. The method of claim 13, wherein the diagnostics primitives comprise one or more of disturber's PSDs, FEXT coupling, SNR based on sync symbols, line referred noise, FEXT-free noise, background noise, a histogram of noise distribution, moments of noise distribution, correlation between adjacent tones, and transmitter non-linearity.

15. A communications system, comprising:
a sending entity that periodically sends sync symbols in a path in the communications system;
a receiving entity that periodically receives error packets containing error data that is calculated based on the sent sync symbols, the error data thereby characterizing line conditions in the path, wherein the error data comprises normalized error data samples; and
an analysis apparatus that monitors the line conditions using the received error packets, the analysis apparatus comprising one or more of customer premises equipment (CPE), a vector control entity (VCE) and a diagnostics application that is remote from the CPE and VCE.

16. The system of claim 15, wherein the analysis apparatus derives diagnostic physical (PHY) layer primitives from the error data in the error packets.

17. The system of claim 16, wherein the diagnostics primitives comprise one or more of disturber's PSDs, FEXT coupling, SNR based on sync symbols, line referred noise, FEXT-free noise, background noise, a histogram of noise distribution, moments of noise distribution, correlation between adjacent tones, and transmitter non-linearity.

18. The system of claim 15, wherein the error packets comprise ERB as provisioned in ITU-T G.993.5.

19. The system of claim 15, wherein the communications system is a very high bit rate digital subscriber line (VDSL) system.

20. The system of claim 15, wherein the path is a downstream path.

21. The system of claim 15, further comprising a forwarding apparatus that forwards the error packets to the remote diagnostics application via a network.

22. The system of claim 21, wherein the forwarding apparatus comprises a proxy device.

\* \* \* \* \*